(12) United States Patent
Abe

(10) Patent No.: US 6,206,172 B1
(45) Date of Patent: Mar. 27, 2001

(54) PTP CONVEYING METHOD AND APPARATUS THEREFOR

(75) Inventor: Shinichi Abe, Saitama (JP)

(73) Assignee: Omori Machinery Co., Ltd., Koshigaya (JP)

( * ) Notice: Subject to any disclaimer, the term of this patent is extended or adjusted under 35 U.S.C. 154(b) by 0 days.

(21) Appl. No.: 09/237,144

(22) Filed: Jan. 25, 1999

(30) Foreign Application Priority Data

Jan. 26, 1998 (JP) .................................................. 10-026351
Apr. 13, 1998 (JP) .................................................. 10-101130

(51) Int. Cl.$^7$ .................................................. B65G 47/24
(52) U.S. Cl. ..................................... 198/403; 198/377.07
(58) Field of Search ............................... 198/375, 377.04, 198/377.07, 377.08, 379, 403, 404, 689.1, 803.5

(56) References Cited

U.S. PATENT DOCUMENTS

| | | | |
|---|---|---|---|
| 3,685,624 | * 8/1972 | Paddock | 193/7 |
| 3,827,577 | * 8/1974 | Kurk et al. | 414/790 |
| 3,997,781 | * 12/1976 | Messman | 250/223 R |
| 4,143,776 | * 3/1979 | Meyers et al. | 414/735 |
| 4,444,423 | * 4/1984 | Montferme et al. | 294/87.1 |
| 4,444,424 | * 4/1984 | Lebret | 294/87.1 |
| 4,626,167 | * 12/1986 | Bond et al. | 414/786 |
| 4,832,180 | * 5/1989 | Ferrero | 198/468.3 |
| 4,894,908 | * 1/1990 | Haba, Jr. et al. | 29/711 |
| 5,020,964 | * 6/1991 | Hyatt et al. | 414/751 |
| 5,025,910 | * 6/1991 | Lasure et al. | 198/377 |
| 5,142,956 | * 9/1992 | Ueno et al. | 83/102 |
| 5,251,422 | * 10/1993 | Goodman et al. | 53/251 |
| 5,370,216 | * 12/1994 | Tsuruyama et al. | 198/395 |
| 5,509,191 | * 4/1996 | Best | 29/722 |
| 5,560,183 | * 10/1996 | James | 53/446 |
| 5,709,067 | * 1/1998 | Dey et al. | 53/430 |
| 5,829,222 | * 11/1998 | Schlagel et al. | 53/54 |
| 5,931,279 | * 8/1999 | Pedrotto et al. | 198/468.3 |

FOREIGN PATENT DOCUMENTS

| | | |
|---|---|---|
| 0070252A1 | * 7/1982 | (EP) . |
| 7-2358 | 1/1995 | (JP) . |
| 7-2359 | 1/1995 | (JP) . |

* cited by examiner

Primary Examiner—James R. Bidwell
(74) Attorney, Agent, or Firm—Dougherty & Clements LLP (57) ABSTRACT

A method and an apparatus for inverting selected ones of a plurality of PTPs being conveyed very easily and simply are disclosed. An inverting device 20 is disposed above a conveying passage along which a plurality of PTPs 1 are conveyed in a standing position. The inverting device 20 has rotary units 22 each provided with a plurality of pairs of pinching fingers 13. The inverting device 20 is reciprocated in directions parallel to the conveying passage by a longitudinal shifting mechanism 40 and is moved vertically in directions perpendicular to the conveying passage by a lifting mechanism 30. While the inverting device 20 is advanced by the longitudinal shifting mechanism 40 in synchronism with the movement of the PTPs 1, the pairs of pinching fingers 13 are lowered to the conveying passage by the lifting mechanism 30, are driven to pinch the selected PTPs 1, and are raised from the conveying passage, the rotary units 22 are turned through an angle of 180° to invert the PTPs pinched between the pairs of pinching fingers 13, and then the pairs of pinching fingers 13 are lowered again by the lifting mechanism 30, are driven to release the inverted PTPs 1, and are raised from the conveying passage.

10 Claims, 8 Drawing Sheets

PTP CONVEYING METHOD AND APPARATUS THEREFOR

BACKGROUND OF THE INVENTION

1. Field of the Invention

The present invention relates to a method of conveying PTPs (press-through packs) for tablets or the like and, more specifically, to a PTP conveying method which selects, inverts and conveys some of a plurality of PTPs being conveyed, and a PTP conveying apparatus for carrying out the PTP conveying method.

2. Description of the Related Art

Figure 1A:
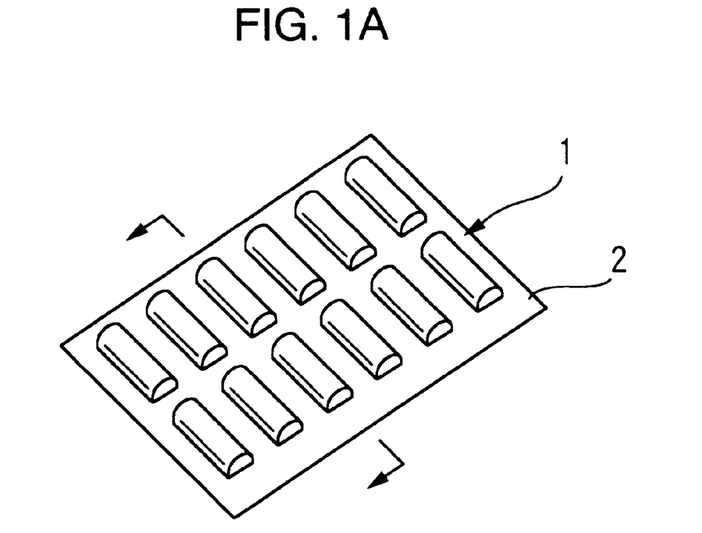
FIGS. 1A and 1B are a perspective view and a fragmentary sectional view, respectively, of a PTP.
Figure 1B:
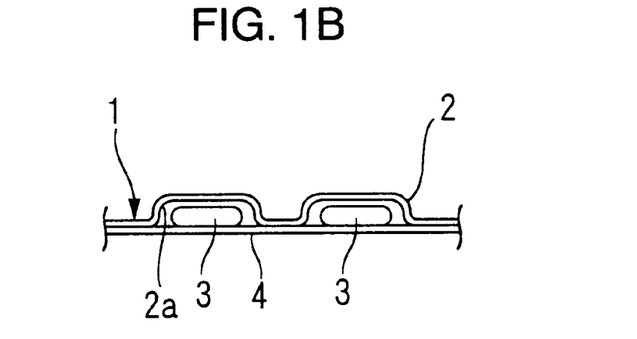

Referring to FIG. 1, a generally known PTP 1 has a plastic sheet 2 provided with a plurality of blisters 2a in one surface thereof (hereinafter, referred to as "blistered surface"), tablets 3 or such are put in the blisters 2a, and the blisters 2a containing the tablets 3 are sealed hermetically by a sheet 4, such as an aluminum foil.

Figure 2:
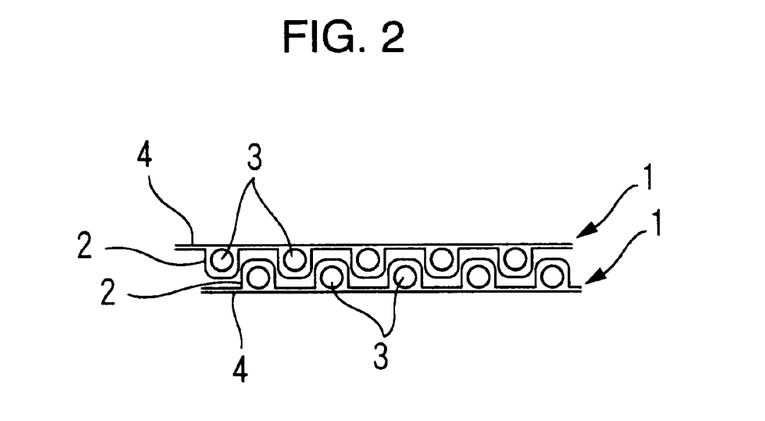
FIG. 2 is a sectional view of a stack of PTPs formed by superposing two PTPs with their blistered surfaces facing each other.

A plurality of such PTPs are superposed in a stack, the stack is bundled with a band, packed in a film or put in a packaging box. When superposing the even number of PTPs, two adjacent PTPs are put one on top of the other with the blistered surfaces thereof facing each other, and the PTPs are dislocated from each other as shown in FIG. 2 so that the blisters 2a of one of the two PTPs are fitted in spaces between the blisters 2a of the other PTP to form the stack of the PTPs in a smaller thickness. When an odd number of such PTPs, i.e., three or more PTPs, are superposed, an even number of PTPs are superposed in the foregoing manner, and the last PTP is placed on the sheet 4 of the uppermost PTP of the stack of the even number of PTPs with its blisters 2a in contact with the sheet 4 of the uppermost PTP or with its sheet 4 in contact with that of the uppermost PTP.

Some of a plurality of PTPs being conveyed in one direction need to be inverted automatically and the inverted PTPs need to be put on the rest of the PTPs, i.e., uninverted PTPs, being conveyed to superpose the plurality of PTPs automatically. The present applicant proposed previously an automatic apparatus for this purpose in Japanese Patent Laid-open Publication Nos. 7-2358 and 7-2359. The aforesaid automatic apparatus comprises a conveying unit for intermittently conveying PTPs arranged with their blistered surfaces provided with blisters extended horizontally, and an automatic inverting unit disposed at the rear terminal end of the conveying unit. A turning means included in this automatic inverting unit comprises a rotary drum and a plurality of rotatable pinching means attached to the rotary drum so as to extend radially. The intermittently conveyed PTPs are subsequently clamped by the pinching means. While the rotary drum is turning through an angle of 180°, the pinching means are rotated about their axes to convey PTPs to a transfer position. The adjacent pinching means are driven for turning through angles of 360° and 540°, respectively, by a gear train consisting of a planetary bevel gear and a fixed bevel gear while the rotary drum is turned through an angle of 180°. A first PTP pinched by a first pinching means at the rear terminal end of the conveying unit with its blistered surface facing up and is transferred to a combining unit with its blistered surface facing up because the pinching means turns through an angle of 360°, and a second PTP following the first PTP is transferred to the combining unit with its blistered surface facing down because the pinching means holding the second PTP is turned through an angle of 540°. Thus, the successive PTPs are combined by the combining unit in pairs of PTPs each of a PTT with its blistered surface facing up and a PTP with its blistered surface facing down, and the pairs of PTPs are delivered to a predetermined position.

A PTP package may contain a stack of an even number of PTPs or an odd number of PTPs, such as three, five or seven PTPs, stacked in the foregoing manner. The automatic inverting unit delivers the inverted PTPs and uninverted PTPs alternately to a transfer position. Therefore, if three successive PTPs are superposed in a stack, an uninverted PTP, an inverted PTP and an uninverted PTP are superposed in that order to form a first stack, and an inverted PTP, an uninverted PTP and an inverted PTP are superposed in that order to form a second stack. Thus, when an odd number of PTPs are superposed to form a stack, stacks of different structures are formed alternately. The stacks of the different structures result in differently structured packages, respectively, and may possibly cause problems in combining the inverted and uninverted PTPs and packaging the stacks of PTPs in subsequent steps.

Accordingly, when combining an odd number of PTPs by the prior art automatic inverting apparatus, the automatic inverting unit needs a special pinching means capable of arranging the odd number of PTPs in a predetermined positional relation. For example, when superposing three PTPs, the number of the pinching means of the rotary drum needs to be a multiple of three, and the pinching means must operate so that the first pinching means sets a first PTP with its blistered surface facing up, the second pinching means sets a second PTP with its blistered surface facing down and the third pinching means sets a third PTP with its blistered surface facing down. The automatic inverting unit needs a more complicated mechanism to combine five or seven PTPs in a set.

The rotary drum of the prior art automatic inverting unit is provided with a plurality of pinching means arranged so as to extend radially, and the adjacent pinching means turn the PTPs through different angles, respectively. Therefore, the prior art automatic inverting unit is complicated and costly, and it is very difficult to operate the prior art automatic inverting unit intermittently at a high operating speed.

In inverting an odd number of PTPs to form a predetermined arrangement, the number and turning angles of the pinching means for turning, for example, three PTPs through different angles, and those of the pinching means for turning five PTPs through different angles are different from each other. Therefore, the automatic inverting unit must be replaced as a whole with another one when the number of PTPs to be superposed is changed, and different automatic inverting units respectively for arranging PTPs to superpose different numbers of PTPs must be kept in reserve, which is costly and requires a troublesome adjusting operation for properly timing the operation of the automatic inverting unit so that the inverting unit may operate in synchronism with the conveying unit when replaced with the old unit which has been used in combination with the aforesaid conveying unit.

SUMMARY OF THE INVENTION

It is one object of the present invention to provide a PTP conveying method capable of very easily, simply and automatically inverting selected ones of a plurality of PTPs being conveyed along a predetermined conveying passage, and a PTP conveying apparatus for carrying out the PTP conveying method.

Another object of the present invention is to provide a PTP conveying method capable of inverting selected ones of PTPs being conveyed continuously, and a PTP conveying apparatus for conveying out the PTP carrying method.

Yet another object of the present invention is to provide a PTP conveying method capable of inverting selected ones of PTPs being conveyed in a direction in a longitudinal arrangement, and a PTP conveying apparatus for carrying out the PTP conveying method.

According to one aspect of the present invention, a PTP conveying method comprises the steps of conveying a plurality of PTPs arranged with their surfaces provided with blisters in parallel to each other along a predetermined conveying passage, separating selected ones of the plurality of PTPs from the conveying passage by pinching the same while the PTPs are being conveyed along the conveying passage, inverting the selected PTPs with respect to the direction of conveying the PTPs, and returning the inverted PTPs to the conveying passage to convey the same together with the rest of the PTPs. Thus, the selected plurality of PTPs are very easily, simply and automatically inverted at a time.

In the PTP conveying method, it is preferable that operations for pinching and inverting the selected PTPs are carried out in synchronism with an operation for moving the rest of the PTPs along the conveying passage.

In the PTP conveying method, it is preferable that the PTPs are supplied continuously on the conveying passage with their surfaces provided with the blisters being in parallel to the surface of the conveying passage, during which the PTPs are held by their edges and arranged such that their surfaces provided with the blisters become parallel with each other so as to intersect with the conveying passage. Even if the PTPs are fed at a high feed speed with their blistered surfaces facing up in a horizontal plane, the PTPs can be inverted while the same are conveyed along the conveying passage at a conveying speed slower than the feed speed and hence the PTPs are very easily inverted.

For example, if sheets of 5 cm in length are conveyed in a conveying mode in which the sheets are placed flat on a conveyor belt and the conveyor belt is moved at a conveying speed of 5 cm/s, only one sheet can be conveyed every second. If the same sheets are conveyed in another conveying mode in which the sheets are placed in an upright standing position on the same conveyor belt at intervals of 1 cm, five sheets can be conveyed every second. Time necessary for conveying one sheet over a predetermined distance by the latter conveying mode is ⅕ of time necessary for conveying the sheet along the same distance by the former conveying mode. Therefore, when a first conveyor and a second conveyor are arranged to convey sheets in a flat position by the first conveyor and in a standing position by the second conveyor, the conveying speed of the second conveyor may be ⅕ the conveying speed of the first conveyor. Therefore the sheets are easily inverted while being conveyed by the second conveyor.

According to another aspect of the present invention, a PTP conveying apparatus comprises a conveying means for conveying a plurality of PTPs in an arrangement with their surfaces provided with blisters in parallel to each other along a predetermined conveying passage, and an inverting means, capable of separating selected ones of the plurality of PTPs from the conveying passage by pinching the selected PTPs and capable of reciprocating in directions intersecting the conveying passage to separate the selected PTPs from the conveying passage, said inverting means inverting the selected PTPs with respect to the direction in which the PTPs are conveyed and returning the inverted selected PTPs to the conveying passage. The PTP conveying apparatus of the present invention provides a very simple construction for easily inverting and conveying the selected PTPs. Such a simple construction of the apparatus also improves a cost efficiency.

Preferably, the inverting means of the PTP conveying apparatus comprises a base, at least one rotary unit supported on said base, a first base reciprocating means for reciprocating the base in directions parallel to the conveying passage, a second base reciprocating means for reciprocating the base in directions perpendicular to the conveying passage, a rotary unit turning means for turning said rotary unit through an angle of 180°, and a plurality of pinching means equipped with said rotary unit. The second base reciprocating means is driven to separate selected ones of the PTPs from the conveying passage by advancing said pinching means into the conveying passage and pinching the selected PTPS with the pinching means while said rotary unit is being advanced by the first base reciprocating means in synchronism with the PTPs moved along the conveying passage. The rotary unit turning means turns the rotary unit through an angle of 180°. The second base reciprocating means is subsequently driven so as to advance the pinching means again into the conveying passage, to release the PTPS, and to move away from the conveying passage.

Thus, the PTPs are inverted while the same are being continuously conveyed, and a desired combination of inverted and uninverted PTPs are made by selectively using the pinching means.

It is preferable that the plurality of pinching means are arranged in a zigzag relationship on said rotary unit so that required numbers of pinching means may be installed.

Preferably, the rotary unit of the PTP conveying apparatus comprises a front rotary unit and a rear rotary unit both supported on the base along the conveying passage, and the front and rear rotary units are provided with the plurality of pinching means respectively. The rotary units may have a relatively smaller turning radius. This will lead to reduction in size of the apparatus.

Preferably, each of the pinching means is a pneumatic chuck provided with a pair of pinching fingers, and the pneumatic chucks are driven selectively by a compressed air source for easy operation. The respective free end portions of the pinching fingers may be aligned on the longitudinal center axes of the rotary units.

Other and further objects, features and advantages of the present invention will appear more fully from the following description.

DESCRIPTION OF THE PREFERRED EMBODIMENTS

Preferred embodiments of the present invention will be described hereinafter with reference to FIG. 3 to FIG. 11B.

Figure 3:
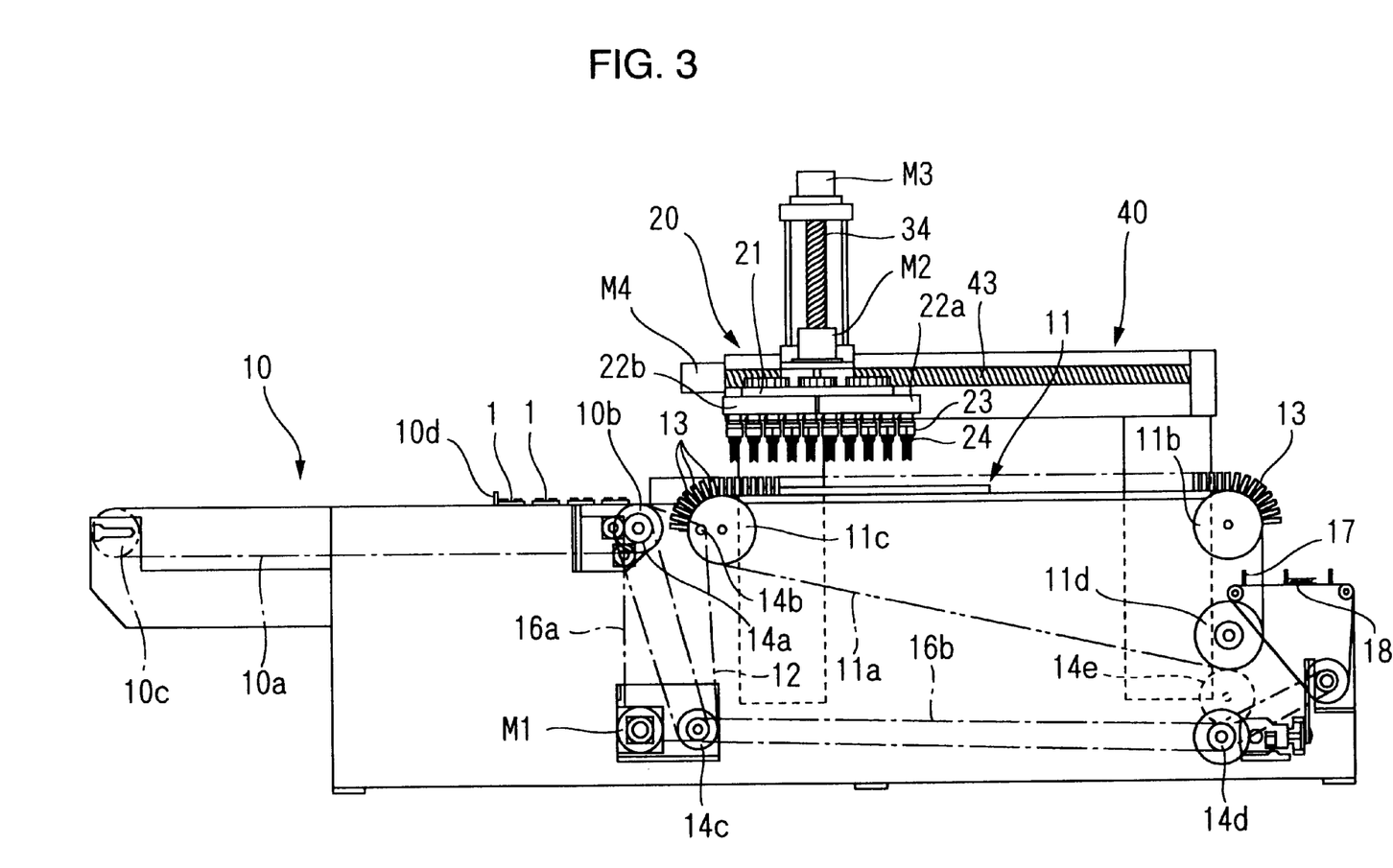
FIG. 3 is a partly sectional front elevation of a PTP conveying apparatus in a preferred embodiment according to the present invention.
Figure 4:
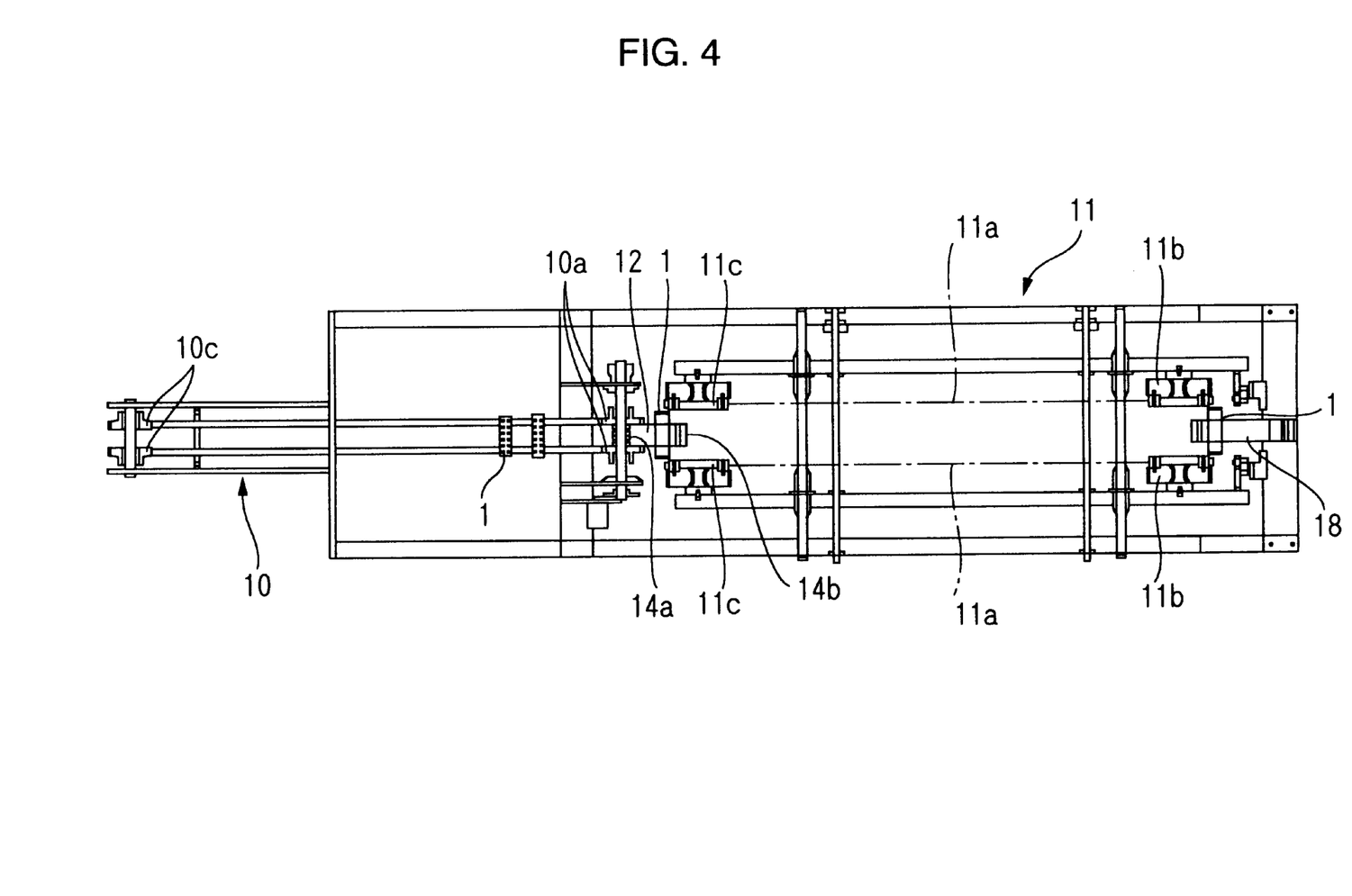
FIG. 4 is a plan view of a driving system for driving conveying devices included in the PTP conveying apparatus of FIG. 3.

Referring to FIG. 3, a PTP conveying apparatus in a preferred embodiment according to the present invention has a first conveying device 10 and a second conveying device 11 disposed at the downstream side of the first conveying device 10 with respect to a direction in which PTPs are conveyed. The first conveying device 10 conveys PTPs 1 set in a horizontal position with their blistered surfaces, i.e., surfaces provided with blisters, facing up. The second conveying device 11 conveys PTPs 1 set in a standing position. A vacuum conveyor 12 is disposed between the conveying devices 10 and 11 to transfer PTPs 1 from the first conveying device 10 to the second conveying device 11.

The first conveying device 10 has a pair of timing-belt pulleys 10b and 10c disposed at the front and the rear ends of a conveying passage, respectively, and a pair of endless belts 10a extended on the opposite sides of the conveying passage and wound around the pair of timing-belt pulleys 10b and 10c. The endless belts 10a are provided with projections 10d at predetermined intervals to push PTPs 1 forwardly.

Figure 6:
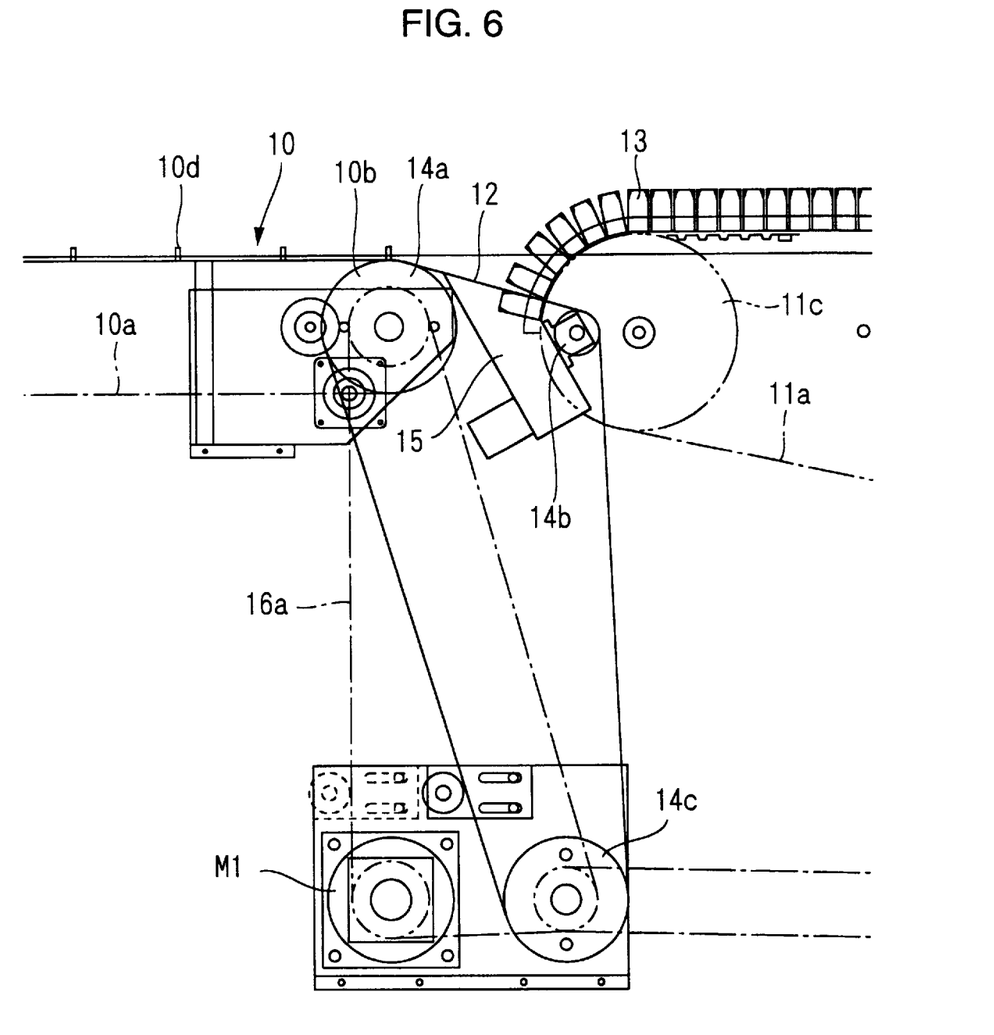
FIG. 6 is a partly sectional front elevation of a part of the PTP conveying apparatus of the present invention around the joint of a first conveying device and a second conveying device.
Figure 7:
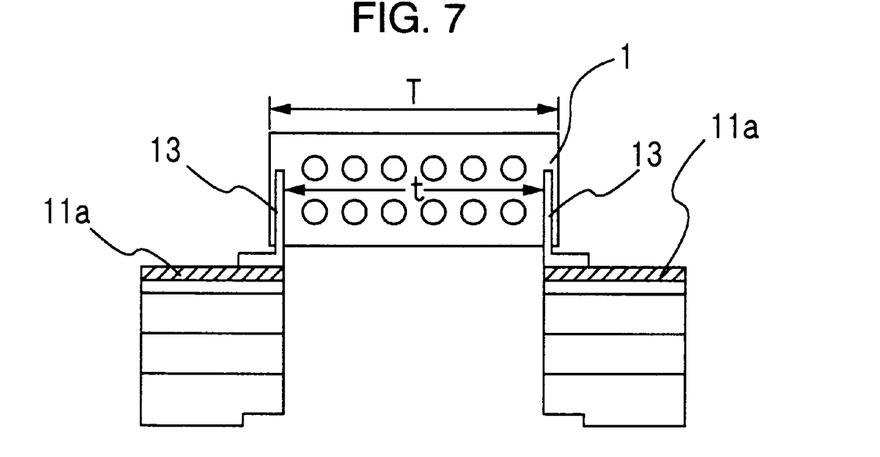
FIG. 7 is a side elevation of a part of the PTP conveying apparatus of the present invention of assistance in explaining the positional relation between opposite pinching plates and the width of PTPs.

The second conveying device 11 has a pair of timing-belt pulleys 11b and 11c disposed at the front and the rear ends of a conveying passage, respectively, and a pair of endless belts 11a extended on the opposite sides of the conveying passage and wound around the pair of timing-belt pulleys 11b and 11c. The rear pulley 11c of the second conveying device 11 at the rear end of the conveying passage of the second conveying device 11 is spaced a small distance apart from the front pulley 10b of the first conveying device 10 at the front end of the conveying passage of the first conveying device 10. As shown in FIG. 6, the endless belts 11a of the second conveying device 11 are provided with a plurality of pinching plates 13 attached to the endless belts 11a in a dense longitudinal arrangement at very small intervals corresponding to the thickness of the edges of PTPs 1. The corners of the free end of each pinching plate 13 are chamfered. The longitudinal positions of the pinching plates 13 arranged on one of the endless belts 11a correspond exactly with those of the pinching plates 13 arranged on the other endless belt 11a, respectively, and the distance t between the corresponding pinching plates 13 on the endless belts 11a is smaller than the width T of the PTPs 1 as shown in FIG. 7 and is adjustable. Each PTP is pinched between the adjacent pinching plates 13 on one of the endless belts 11a and between the adjacent pinching plates 13 on the other endless belt 11a.

The vacuum conveyor 12 is an air-permeable endless belt wound around a first pulley 14a disposed between and coaxially with the front timing-belt pulleys 10b of the first conveying device 10, a second pulley 14b disposed between the rear timing-belt pulleys 11c of the second conveying device 11, and a third pulley 14c disposed on a base frame below the second conveying device 11. A suction device 15 is disposed under a section of the air-permeable belt 12 between the timing-belt pulleys 10b and 11c.

As shown in FIG. 3, The timing-belt pulleys 10b, 10c of the first conveying device 10, the timing-belt pulleys 11b and 11c of the second conveying device 11, and the air-permeable belt of the vacuum conveyor 12 are driven for synchronous operation by a first servomotor M1 held in a base frame disposed in a lower part of the front end part of the first conveying device 10. The first servomotor M1 drives the front timing-belt pulleys 10b of the first conveying device 10 and the third pulley 14c of the vacuum conveyor 12 through a first driving belt 16a. The third pulley 14c is engaged with a fourth pulley 14d disposed in a lower region of the front end of the second conveying device 11 by a second driving belt 16b. The fourth pulley 14d is coupled with a driven timing-belt pulley 11d disposed in a lower portion of the second conveying device 11 by a gear 14e. The endless belts 11a of the second conveying device 11 are wound around the driven timing-belt pulley 11d and the timing-belt pulleys 11b and 11c.

When the endless belts 10a of the first conveying device 10 are driven, PTPs 1 are advanced by the projections 10d of the endless belts 10a. Upon the arrival of each PTP 1 at the front end of the first conveying device 10, the PTP 1 is attracted by suction to the vacuum conveyor 12 and is conveyed toward the second conveying device 11. The air-permeable belt of the vacuum conveyor 12 overlaps the conveying passage defined by the endless belts 11a of the second conveying device 11. The air-ermeable belt of the vacuum conveyor 12 and the endless belts 11a of the second conveying device 11 are driven synchronously so that the opposite side parts of the PTP 1 may be inserted in the gaps between the pairs of adjacent pinching plates 13 attached to the endless belts 11a of the second conveying device 11. The pinching plates 13 pinching the PTP 1 therebetween rise gradually as the endless belts 11a turn, and stand substantially vertically after passing the rear timing-belt pulleys 11c and remain in a vertical position until the pinching plates 13 reach the front timing-belt pulleys 11b. Thus, the PTPs 1 are held in a vertical position between the adjacent pinching plates 13 pinching the side parts of the PTPs 1 and are conveyed forward by the second conveying device 11.

A delivery belt 18 included in a delivery unit is disposed at the front end of the second conveying device 11 so as to overlap a section of the conveying passage of the second conveying device 11 between the front timing-belt pulley 11b and the driven timing-belt pulley 11 The delivery belt 18 is provided on its outer side with projections 17 of a size slightly greater than the interval between the two adjacent PTPs 1 arranged at predetermined intervals. The PTPs 1 extending substantially horizontally after passing the front timing-belt pulleys 11b are removed two at a time, in this embodiment, from the gaps between the adjacent pinching plates 13 by the projections 17 of the delivery belt 18.

Figure 8:
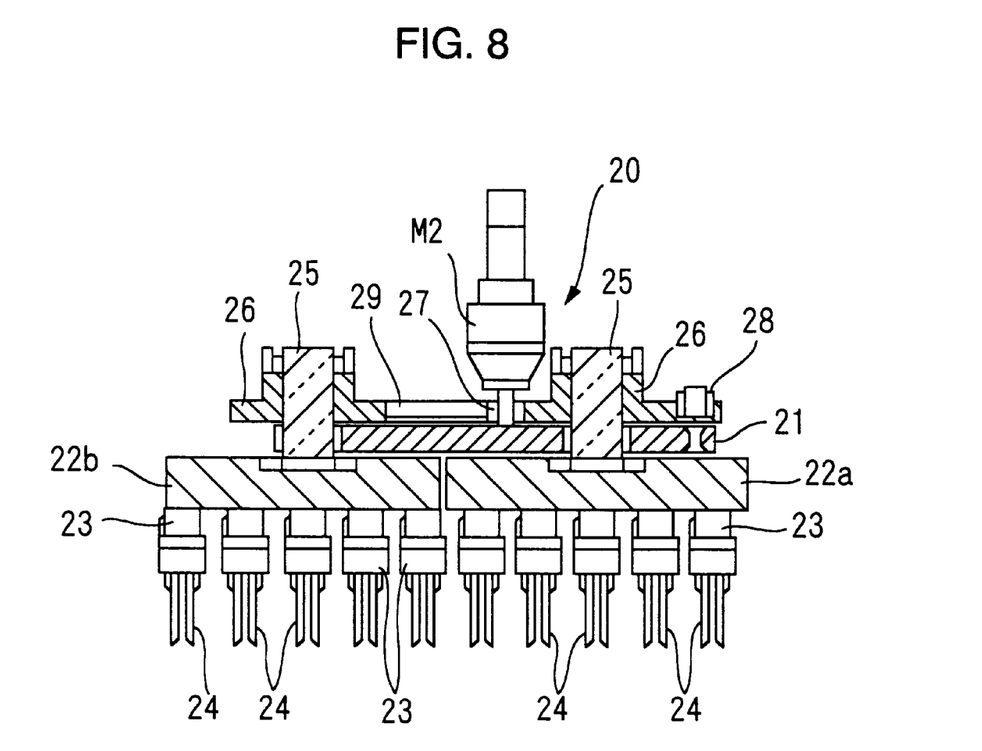
FIG. 8 is a partly sectional front elevation of an essential part of an inverting device according to the present invention.

An inverting device 20, which is a major component of the PTP conveying apparatus of the present invention, is disposed above the second conveying device 11 on a frame. As shown in FIG. 8, the inverting device 20 has a base 21, two rotary units 22 (a front rotary unit 22a and a rear rotary unit 22b) supported on the base 21 in a longitudinal arrangement in a conveying direction. Each rotary unit 22 is provided with a plurality of pneumatic chucks 23.

Figure 9:
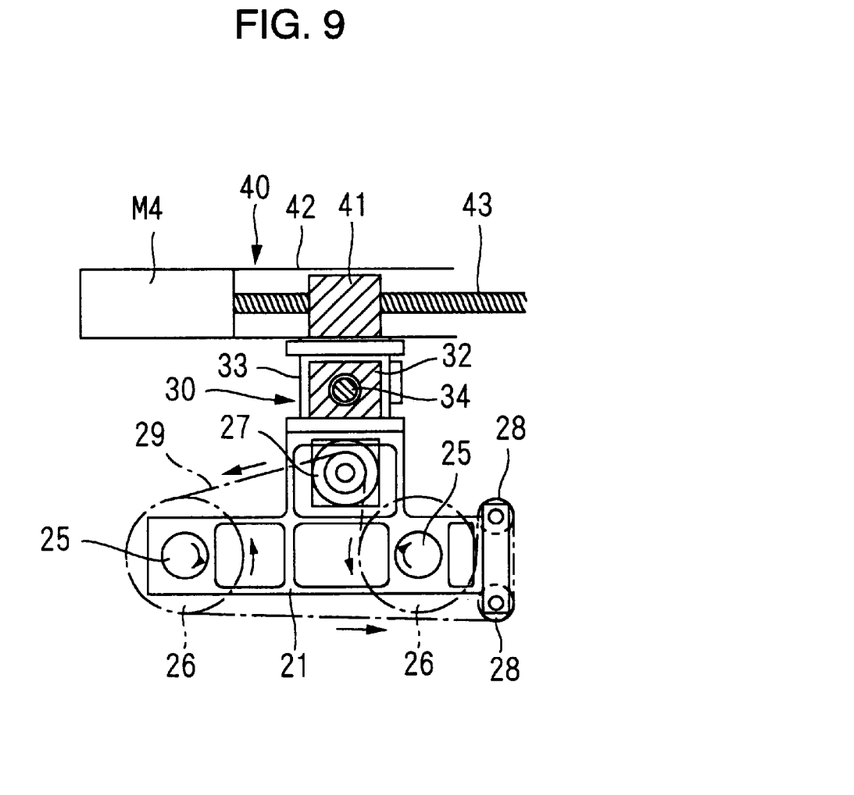
FIG. 9 is a plan view of the inverting device of assistance in explaining a mode of turning of rotary units included in the inverting device.

More specifically, a shaft 25 fixed to a central part of each rotary unit 22 is extended through the base 21, and a pulley 26 is attached to an end part of the shaft 25 projecting upward from the base 21. A second servomotor M2 is mounted on the base 21, and a drive pulley 27 is attached to the output shaft of the servomotor M2. A belt 29 is wound around the drive pulley 27 and the pulleys 26 attached to the shafts 25 via guide pulleys 28 supported for rotation on a front end part of the base 21 as shown in FIG. 9 so as to drive the shafts 25 for rotation respectively in opposite directions. The opposite longitudinal ends of each rotary unit 22 are formed in an arc of a circle having its center on the center of the rotary unit 22 to enable the rotary units 22 to rotate around the shafts 25 even if the same are disposed close to each other.

Figure 5:
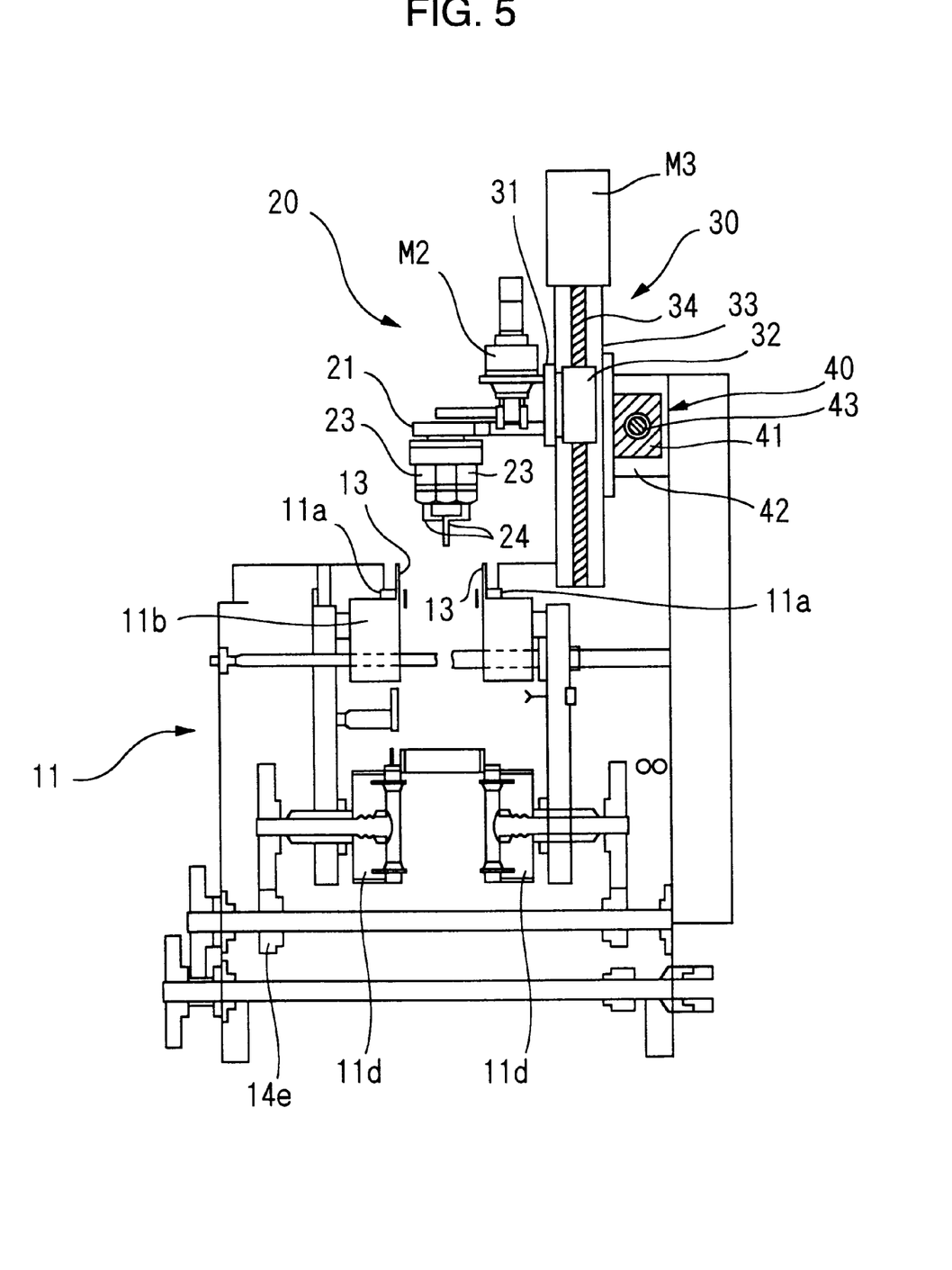
FIG. 5 is a partly sectional side elevation of the PTP conveying apparatus of the present invention.
Figure 10:
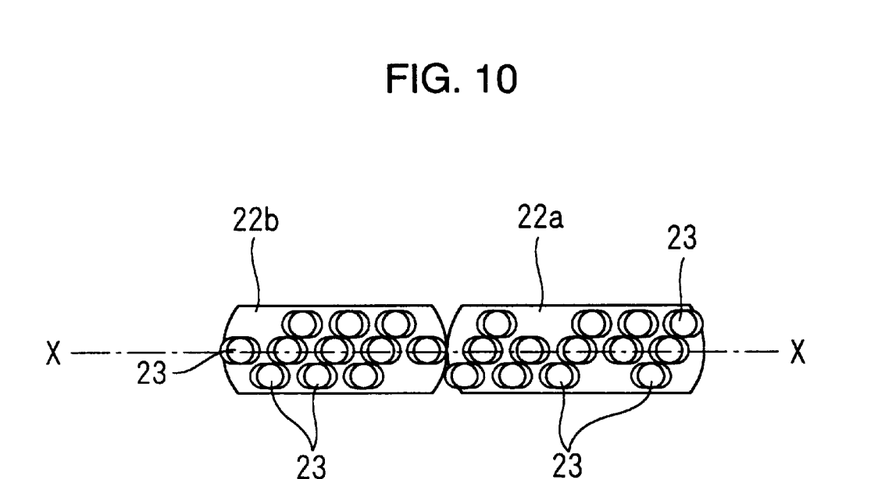
FIG. 10 is a plan view of the rotary units of the inverting device of assistance in explaining the arrangement of pneumatic chucks on the rotary units.

Referring to FIG. 10, in this embodiment, the front rotary unit 22a is provided with the thirteen pneumatic chucks 23, and the rear rotary unit 22b is provided with the eleven pneumatic chucks 23. The pneumatic chucks 23 are arranged zigzag on the rotary units 22 to install as many pneumatic chucks 23 as possible in a limited area on the rotary units 22. Each of the pneumatic chucks 23 is provided with a pair of pinching fingers 24. The pinching fingers 24 of the pneumatic chucks 23 arranged along the longitudinal axes "X" of the rotary units 22 in FIG. 10 extend vertically downward, while the pinching fingers 24 of the rest of the pneumatic chucks 23, i.e., the eight pneumatic chucks 23 on the front rotary unit 22a and the six pneumatic chucks 23 on the rear rotary unit 22b, are bent in an inverted L shape so that lower parts of the pinching fingers 24 lie on the same longitudinal axes of the rotary units 22 as shown in FIG. 5. Therefore, although the pneumatic chucks 23 are arranged zigzag on the rotary units 22, the lower parts of the pinching fingers 24 are aligned on the longitudinal center axes of the rotary units 22. The reason for providing the different numbers of the pneumatic chucks 23 on the rotary units 22, respectively, will be explained later. The pneumatic chucks 23 must be arranged symmetrically with respect to the center of turning of the rotary unit 22 regardless of the number of the pneumatic chucks 23.

Each pneumatic chuck 23 has a linkage for operating the pinching fingers 24, and a pneumatic cylinder actuator provided with a piston for operating the linkage. The linkage is driven by the pneumatic cylinder actuator so as to move the pinching fingers 24 toward and away from each other. The pneumatic cylinder actuators of the pneumatic chucks 23 are connected to a compressed air source (not shown).

The base 21 of the inverting device 20 is attached to a lifting mechanism 30 supported on a longitudinal shifting mechanism 40.

As shown in FIG. 5, the lifting mechanism 30 has a slide block 32 integrally provided with a vertical wall 31 joined to a side surface of the base 21 of the inverting device 20, and provided with an internal thread. The slide block 32 is fitted for sliding movement in a vertical guide frame 33 vertically set on the frame. A vertical threaded rod 34 is threaded to the slide block 32 to form a ball screw. The vertical threaded rod 34 is driven for rotation by a third servomotor M3 mounted on the upper end of the vertical guide frame 33.

When the output shaft of the third servomotor M3 rotates in opposite directions, the base 21 of the inverting device 20 connected to the slide block 32 moves vertically to move the pinching fingers 24 of the pneumatic chucks 23 supported on the base 21 toward and away from the conveying passage of the second conveying device 11.

The longitudinal shifting mechanism 40 has a horizontal slide block 41 provided with an internal thread. The horizontal slide block 41 is attached to the outer side surface of the vertical guide frame 33 of the lifting mechanism 30 and is fitted for sliding in a horizontal guide frame 42 fixedly mounted on the frame. A horizontal threaded rod 43 is threaded to the horizontal slide block 41 to form a ball screw. The horizontal threaded rod 43 is driven for rotation by a fourth servomotor M4 mounted on a rear end part of the horizontal guide frame 42 shown in FIGS. 3 and 9.

When the output shaft of the fourth servomotor M4 rotates in opposite directions, the base 21 of the inverting device 20 and the lifting mechanism 30 move horizontally along the horizontal guide frame 42 in opposite directions to reciprocate the pinching fingers 24 of the pneumatic chucks 23 supported on the base 21 along the conveying passage of the second conveying device 11.

Every other PTP 1 is inverted while the PTPs 1 are being conveyed along the conveying passage of the second conveying device 11 by a PTP inverting operation of the inverting device 20. The PTP inverting operation will be described below.

First, the selected longitudinally alternate pneumatic chucks 23 are controlled so as to be connected through selector valves (not shown) to the compressed air source. The rest of the pneumatic chucks 23 are controlled so as to be disconnected from the compressed air source so that their pairs of pinching fingers 24 are separated from each other.

While the inverting device 20 is being moved forward from its starting position corresponding to the rear end of the longitudinal shifting mechanism 40 by the fourth servomotor M4 of the longitudinal shifting mechanism 40 at a speed equal to a conveying speed at which the PTPs 1 are conveyed by the second conveying device 11, the third servomotor M3 of the lifting mechanism 30 is actuated to move the inverting device 20 downward. At this stage, all the pinching fingers 24 of the pneumatic chucks 23 are at their releasing positions, and the pairs of pinching fingers 24 are lowered along the respective middle parts of the PTPs 1, respectively. The third servomotor M3 is stopped upon arrival of the lower ends of the pinching fingers 24 at the positions near the lower edges of the corresponding PTPs 1. Then, compressed air is supplied to the aforesaid selected pneumatic chucks 23 to pinch the alternate PTPs 1 firmly between the respective pinching fingers 24.

Subsequently, the output shaft of the third servomotor M3 is rotated in the reverse direction to lift up the inverting device 20 holding the alternate PTPs 1, and the third servomotor M3 is stopped upon the separation of the lower edge of the lifted PTPs 1 by a sufficient distance from the conveying passage of the second conveying device 11 to stop lifting up the inverting device 20. Then, the second servomotor M2 is actuated to turn the two rotary units 22a and 22b through an angle of 180° in opposite directions, respectively, as shown in FIG. 9 and the second servomotor M2 is stopped after the rotary units 22a and 22b have been turned through an angle of 180°. Consequently, the PTPs 1 held by the inverting device 20 are inverted with respect to a direction in which the PTPs are being conveyed.

Subsequently, the third servomotor M3 is actuated again to move the inverting device 20 downward to return the inverted PTPs 1 to the second conveying device 11. Since the inverting device 20 is advancing at a speed equal to the conveying speed of the second conveying device 11 and the selected PTPs 1 are arranged on the rotary units 22a and 22b at the positions symmetrical with respect to the turning axes of the rotary units 22a and 22b, the inverted PTPs 1 are returned to the vacant spaces between the pinching plates 13 alternating with the occupied spaces between the pinching plates 13. Consequently, the alternate PTPs 1 are set with their blistered surfaces facing forward and the rest of the PTPs 1 are set with their blistered surfaces facing backward on the second conveying device 11.

After the inverted PTPs 1 have thus been returned to the second conveying device 11, the third servomotor M3 is stopped and the pneumatic chucks 23 are operated by the compressed air so as to move the pairs of pinching fingers 24 away from each other, the third servomotor M3 is reversed to lift up the inverting device 20 above the conveying passage of the second conveying device 11, and then the third servomotor M3 is stopped.

Then, the fourth servomotor M4 is reversed at a high operating speed to return the inverting device 20 rapidly to the starting position, and then the foregoing PTP inverting operations are repeated. Thus, the inverted PTPs 1 and the uninverted PTPs 1 in an alternate arrangement are conveyed toward the delivery belt 18 of the delivery unit.

The apparatus in this embodiment has been described as applied to carrying the inverted PTPs 1 and the uninverted PTPs 1 in an alternate arrangement to provide stacks, each of which containing an even number of superposed PTPs. The PTP conveying apparatus of the present embodiment is also capable of providing stacks, each of which including an odd number of superposed PTPs, having the same shape by selecting an appropriate set of the chucks 23.

Figure 11A:
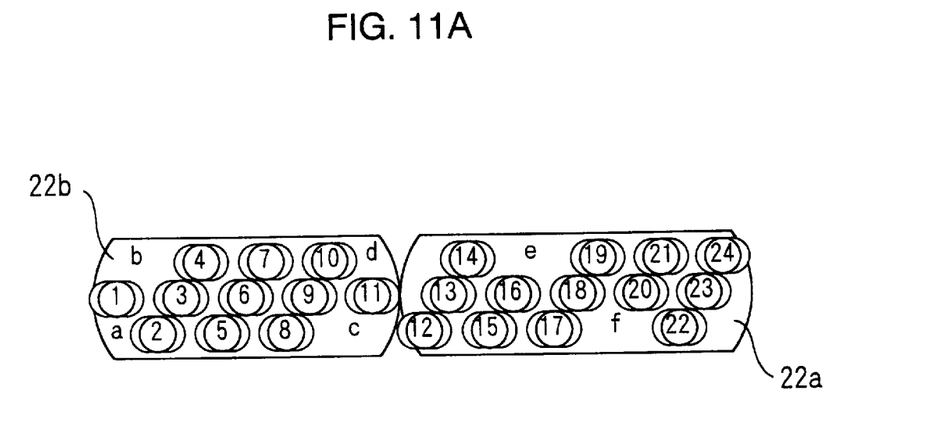
FIGS. 11A and 11B are views for explaining the arrangement of the pneumatic chucks and modes of operation of the pinching fingers of the pneumatic chucks.
Figure 11B:
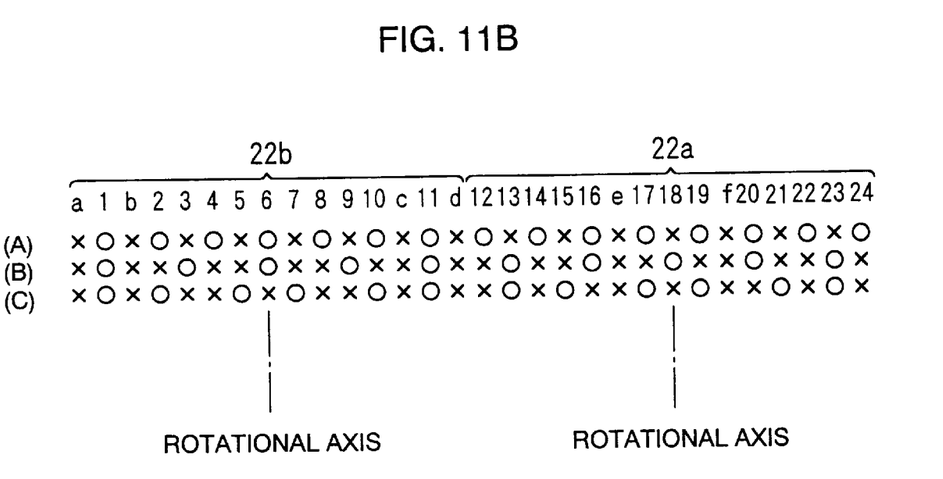

In FIG. 11A showing the arrangement of the pneumatic chucks 23 on the rotary units 22a and 22b, numerals 1 to 24 indicate the pneumatic chucks 23, and letters a to f indicate the locations where the pneumatic chucks are not attached to. FIG. 1B shows the linear arrangement of the pneumatic chucks (1) to (24) and (a) to (f) along the conveying passage of the second conveying device 11. The positions of the pneumatic chucks (18) and (6) correspond to the turning axes of the rotary units 22a and 22b, respectively. Mode (A) shown in FIG. 1B inverts alternate ones of thirty PTPs being carried to provide stacks, each having an even number of PTPs. In FIG. 11B, circles (○) indicate inverted PTPs by the foregoing PTP inverting operations, and crosses (×) indicate uninverted PTPs. Mode (B) in FIG. 11B inverts the PTPs indicated by circles to provide stacks each of three PTPs, in which three successive PTPs from right to left in FIG. 11B indicated by ×○× or ○×× make a stack. Mode (C) in FIG. 11B inverts the PTPs indicated by circles to provide stacks each of five PTPS, in which five successive PTPs from right to left in FIG. 11B indicated by ×○×○× or ○×○×× make a stack.

Actually, no pneumatic chuck is disposed at the positions (a) and (b) on the opposite sides of the pneumatic chuck No. 1, at the positions (c) and (d) on the opposite sides of the pneumatic chuck No. 11, and at the positions (e) and (f) respectively in front of the pneumatic chucks Nos. 16 and 19. This is because the PTPs corresponding to the positions (a) to (f) need not be inverted in any one of the cases of forming stacks of an even number of PTPs, three PTPs and five PTPs.

As is apparent from the foregoing description, the inverting device of the PTP conveying apparatus in accordance with the present invention is capable of providing a stack of a desired odd number of superposed PTPs as well as a stack of an even number of superposed PTPs by selectively driving the appropriate pneumatic chucks.

Although the invention has been described in its preferred embodiment, the present invention is not limited thereto in its practical application and various modifications are possible.

For example, although the conveying passage of the second conveying device in the foregoing embodiment is horizontal, the same may be inclined or vertical and the inverting device may be reciprocated in directions perpendicular and parallel to the conveying passage.

Although the inverting unit of the PTP conveying apparatus in the foregoing embodiment inverts the selected PTPs while the PTPs are conveyed continuously by the second conveying device, the PTPs may be conveyed intermittently. If the PTPs are conveyed intermittently, the operation for longitudinally shifting the inverting device can be omitted, since only the operations for vertically moving the inverting device and for turning the rotary units are necessary.

The inverting unit may be provided with one rotary unit or three or more rotary units instead of the two rotary units 22a and 22b. If the inverting device is provided with a number of rotary tables other than two rotary tables, the arrangement of the pneumatic chucks may be designed properly.

The pneumatic chucks attached to the rotary units are only an example of various PTP holding means; any suitable ones of mechanical and electrical holding means may be employed instead of the pneumatic chucks.

Since the distance t between the pinching plates 13 shown in FIG. 7 is adjustable according to the size of the PTPS, the PTP conveying apparatus of the present invention is applicable to conveying PTPs of different sizes.

The foregoing invention has been described in terms of preferred embodiments. However, those skilled in the art will recognize that many variations of such embodiments exist. Such variations are intended to be within the scope of the present invention and the appended claims.

What is claimed is:

1. A method for conveying a plurality of PTPs (Press-Through Packs), each of which is provided with a plurality of blisters in one surface thereof for containing tablets or the like, comprising the steps of:

conveying a plurality of PTPs along a predetermined conveying passage, said PTPs being arranged in parallel to each other with their one surface provided with the blisters being in the same direction;

separating some selected ones of said number of PTPs from said conveying passage by pinching the same while said PTPs are being conveyed along said conveying passage;

inverting said selected PTPs as much as 180 degrees with respect to the previous position such that the inverted PTPs have the one surface provided with the blisters faced to the opposite direction with respect to said one surface of the non-selected PTPs in said conveying passage; and returning said inverted PTPs to said conveying passage to convey the same together with the rest of said PTPS.

2. A method for conveying PTPs according to claim 1, wherein the steps for pinching and inverting said selected PTPs are carried out in synchronism with the movement of the rest of said PTPs along said conveying passage.

3. A method for conveying PTPs according to claim 1 or 2, wherein said PTPs are transferred on said conveying passage from a supply conveyor in which the one surface of each PTP provided with the blisters is parallel to the surface of said supply conveyor, said PTPs being held by their edges while being transferred onto said conveying passage from said supply conveyor and arranged such that their one surfaces provided with the blisters become parallel with each other so as to intersect with said conveying passage.

4. An apparatus for conveying PTPs comprising:

a conveying means for conveying a number of PTPs along a predetermined conveying passage, said PTPs being arranged in parallel to each other with their one surface provided with the blisters being in the same direction; and an inverting means, capable of reciprocating along a passage intersecting with said conveying passage, having means for pinching some selected PTPs in said conveyor passage and separating said selected ones from said conveying passage, said inverting means inverting said separated PTPs as much as 180 degrees with respect to the previous position such that the inverted PTPs have one surface provided with the blisters faced to the opposite direction with respect to said one surface of the non-selected PTPs in said conveying passage and returning said inverted PTPs to said conveying passage.

5. An apparatus for conveying PTPs according to claim 4, wherein;

said inverting means comprises a base, at least one rotary unit supported on said base, a first reciprocating means for reciprocating said base in directions parallel to said conveying passage, a second reciprocating means for reciprocating said base in directions perpendicular to said conveying passage, a turning means for turning said rotary unit through an angle of 180°, and a plurality of pinching means mounted on said rotary unit;

said second reciprocating means is driven to separate selected ones of said PTPs from said conveying passage by advancing said pinching means into said conveying passage and pinching said selected PTPs with said pinching means while said rotary unit is being advanced by said first reciprocating means in synchronism with said PTPs moved along said conveying passage, said turning means turns said rotary unit through an angle of 180° said second reciprocating means is subsequently driven so as to advance said pinching means again into said conveying passage, to release said PTPS, and to move away from said conveying passage.

6. An apparatus for conveying PTPs according to claim 5, wherein said plurality of pinching means are mounted in a zigzag relationship on said rotary unit.

7. An apparatus for conveying PTPs according to claim 5, wherein said rotary unit comprises a front rotary unit and a rear rotary unit both supported on said base along the longitudinal direction of said conveying passage, said front and rear rotary units being provided with said plurality of pinching means respectively.

8. An apparatus for conveying PTPs according to claim 7, wherein said plurality of pinching means are arranged in a zigzag relationship on each said rotary unit.

9. An apparatus for conveying PTPs according to claim 8, wherein each of said pinching means includes a pneumatic chuck provided with a pair of pinching fingers, said pneumatic checks being driven selectively by a compressed air source.

10. An apparatus for conveying PTPs according to claim 9, wherein said respective free end portions of said pinching fingers are aligned on the longitudinal center line of said rotary unit.

* * * * *